Figure 2:
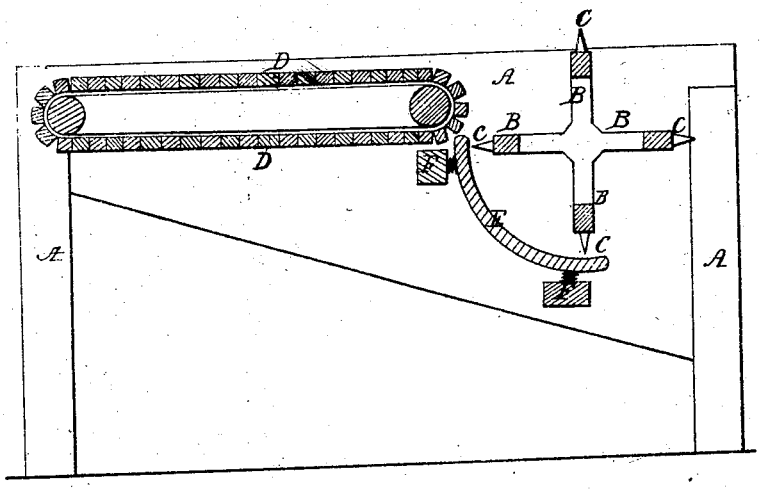
Figure 1:
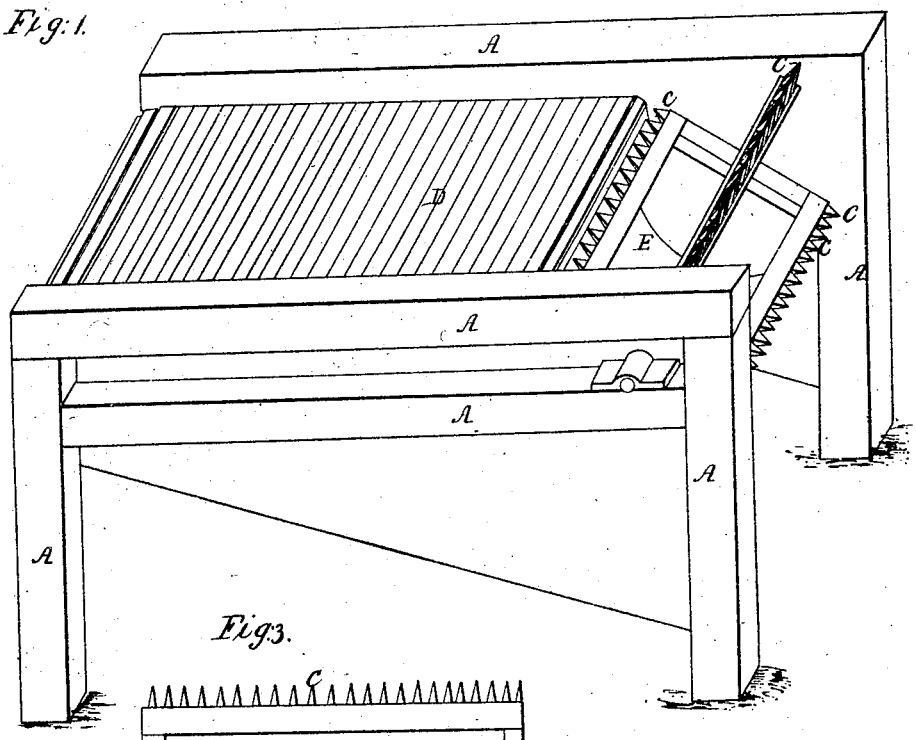
Figure 3:
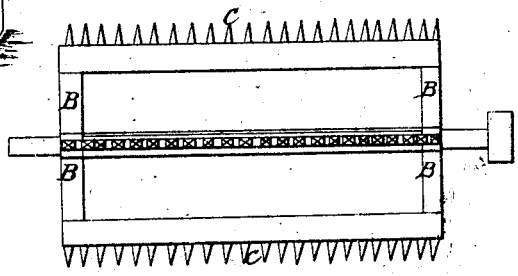

6319X

I. Norton.

Thrashing Mach.

Patented Jan. 6, 1831.

United States Patent Office

PTO - BOYERS, PA Duty Station

MISSING PAGE TEMPORARY NOTICE

PATENT # 6319X FOR ISSUE DATE 1-6-1831

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text

Data Conversion Operation

Boyers, Pa